July 28, 1925.
C. J. HOARE
1,547,419
PRESS STUD
Filed July 16, 1924
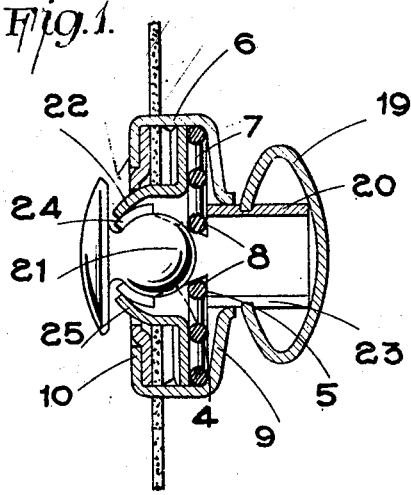
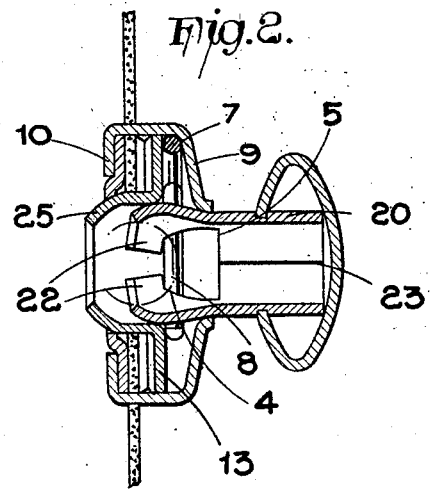
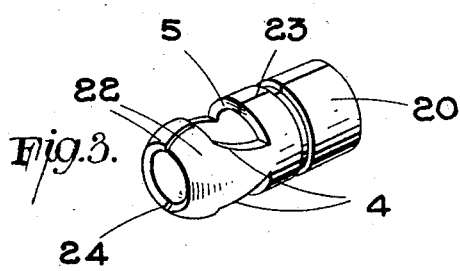
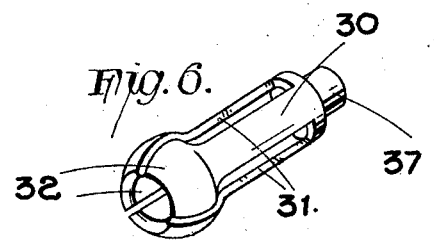
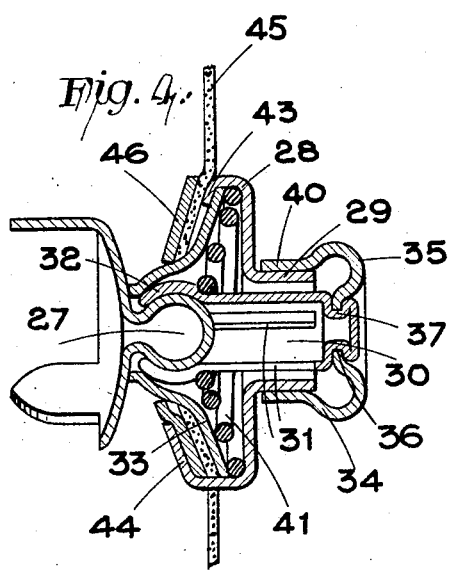
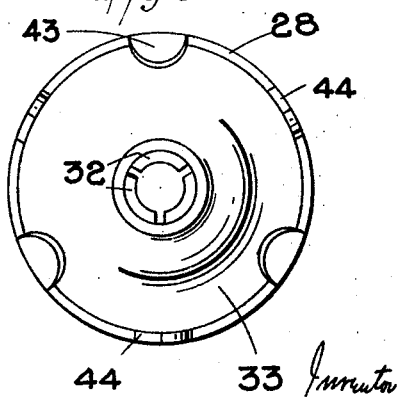

Patented July 28, 1925.

1,547,419

UNITED STATES PATENT OFFICE.

CHARLES JOHN HOARE, OF BIRMINGHAM, ENGLAND, ASSIGNOR OF TWO-FIFTHS TO NEVILLE ALLDAY, OF FOUR OAKS, ENGLAND, AND ONE-FIFTH TO HENRY ALLDAY & SON (1922) LIMITED, OF BIRMINGHAM, ENGLAND, A BRITISH COMPANY.

PRESS STUD.

Application filed July 16, 1924. Serial No. 726,354.

*To all whom it may concern:*

Be it known that I, CHARLES JOHN HOARE, a subject of the King of Great Britain, residing at 142ª Broad Street, Five Ways, Birmingham, in the county of Warwick, England, have invented certain new Improvements in Press Studs; and I do hereby declare the following to be a full, clear, and exact description of the same.

This invention relates to press studs and is primarily intended for comparatively large press studs as employed in connection with the hoods of vehicles or the aprons of side cars, and for other similar purposes, and refers to that class of such which are provided with a headed stud and a socket, the socket having a retaining device which is adapted to engage with the stud to retain it in the socket and having means for releasing the retaining member prior to the withdrawal of the stud.

According to this invention we provide a press stud wherein the socket comprises a socket member or casing having a tapered interior surface, a sleeve slidably mounted in said socket, one end of said sleeve having claws to engage with the stud and the other end projecting beyond the socket whereby the sleeve can be manually operated, the claws engaging with the tapered surface so that they are moved together to retain the stud, but by retracting the sleeve the claws will be disengaged from the tapered surface so that they can move apart to allow the stud to be freely inserted or withdrawn and a spring, one end of which abuts against the socket member or casing and the other end of which acts upon the claw end of the sleeve to normally retain the claws in engagement with the tapered surface.

A further object of the present invention is to reduce the number of parts comprising the socket and thereby cheapen the product, and according to this part of the invention the socket member consists of five elemental parts, comprising a socket member or casing, a cover member having an internally tapered surface and an opening, a sleeve member extending through the socket member and having claws at its inner end which co-act with the tapered surface to grip and retain the stud, a spring within the socket acting upon the claw end of the sleeve to retain the claws in engagement with the tapered surface, and a cap or head on the outer end of said sleeve.

In a specific form of this invention the socket is provided with a tapered interior surface as before and is also provided with a split sleeve slidably mounted in said socket, the split end having or being fashioned with claws to engage with the stud, these claws engaging with the tapered surface in one terminal position of the sleeve so that they are moved together to retain the stud and being disengaged from the tapered surface in the other terminal position so that they can move apart to allow the stud to be freely inserted or withdrawn, means to enable said sleeve to be moved and a volute spring in said socket engaging with the sleeve and serving to normally retain the sleeve in the position in which it retains the claws in engagement with the tapered surface.

Referring to the drawings:—

Figure 1 is a vertical section shewing one form of fastening device.

Figure 2 is a similar view to Figure 1 but shewing the operating member or fastening device in its disengaged position.

Figure 3 is a perspective view of the operating member removed.

Figure 4 is a sectional view shewing a modified form of fastening device according to this invention.

Figure 5 is an end view of same with the stud member removed.

Figure 6 is a perspective view of a portion of the socket member removed.

In the construction illustrated by Figures 1–3 of the accompanying drawings, the socket for the press stud comprises a shallow disc or cup-like portion 6 fitted with a double S wire spring 7 having two oppositely arranged arms 8 which tend to move inwardly towards the centre.

This wire spring is formed of a single length of wire and is retained in the carrying member by clenching over the edge of the cover member 6.

At the centre the cover member is provided with a hole in which is slidably mounted a sleeve 20 and the edge of the cover member around this hole is flanged at 9 to provide an extended bearing for this sleeve.

This cover member is of tapered or conical form. The outer periphery of the member 6 is provided with means for its attachment to the fabric or other material. In the construction illustrated the attachment means comprises a series of projections 10 which extend around the periphery of the member 6 and are adapted to pass through the material to which it is to be secured and are then bent over to retain it in position.

The end of the sleeve 20 or pin that receives the stud 21 is formed or provided with two claws 22. These claws are preferably formed integral with the sleeve or pin as shown, and in this case the whole can be conveniently manufactured from a rectangular blank of sheet metal which is stamped to the required shape and bent around into tubular form. The claw-like ends of the sleeve are partially severed from the main portion by means of longitudinal slots, one 23 of which in the case of the sleeve made from a piece of sheet metal, may be formed by the joining of the two edges of the sheet metal blank and the other 24 by slotting the blank as indicated. These claws are shaped to correspond with and fit around the head of the stud member as shown in Figure 1.

In this case the flanged hole in the cover member which supports the operating member, will be formed with an internally tapered or conical surface 25, the end of smaller diameter being disposed outwardly. In this way the claws at the end of the sleeve or pin will in one position shown in Figure 1, engage with the tapered or conical surface in the cover at its smaller end, in which case the spring claws will be contracted by the tapered surface, and if the stud is located in position they will fit around the head of the stud and firmly retain it in position. When the sleeve or pin is, however, moved into its other position, shown in Figure 2, in which it engages with the larger end of the tapered or conical surface on the socket, the claws will be free to move apart so that the head of the stud will be released, when it can be freely withdrawn from the socket member.

In this case it will be appreciated that the spring 7 will act as a convenient means of normally retaining the sleeve or pin in the position shown in Figure 1 in which it grips the head of the stud.

In this construction the retaining means is disposed at the end of the sleeve or pin and therefore the amount which the head of the stud projects beyond the main body portion can be reduced to a very small amount. This has obvious advantages, for instance, the leverage caused by the projection on the base plate of the stud will be very small so that in the case where the stud or socket is fastened under tension so that it tends to apply a force acting laterally of the press stud as is often the case where the studs are used on hood fittings, the actual force tending to separate the stud members from their support will be reduced to a minimum.

In the construction shown in Figures 4, 5 and 6, the stud member 27 is of similar form to that shown in Figure 1. In this case, however, the socket member comprises a cupped portion 28 having an outwardly extending flange 29 forming a boss-like projection. Within the member 28, a sleeve member which is split longitudinally at 31 is located. This sleeve member is formed with claw-like ends 32 which are adapted to engage around the head of the stud 27. Secured to the member 28 of the socket is a cover member 33 of conical form. This cover member provides an internal inclined or cam surface with which the ends of the claws on the sleeve engage and by which they are pressed inwardly in the position shown in Figure 4, so as to engage around the head of the stud and retain it in position. This sleeve is slidably mounted in the member 28 and is provided at the end opposite to the claws with a head or cap 34 by which it can be moved manually. This cap 34 is provided with a central cupped portion 35 having a central opening 36 through which passes a portion 37 of the sleeve 30. This portion 37 is of reduced diameter and is upset or riveted at 39 so as to lie within the cupped portion 35 of the head or cap. Further, the head or cap is provided with extending flanges 40 which fit around the boss portion 29 so that it is slidably mounted thereby.

The sleeve 30 is thus movable into two terminal positions, one in which it contacts with the inner end of the inclined or cam surface formed by the cover member 33 and the other in which it is moved away from the washer member so that it can expand freely. In the former position the claws will fit firmly around the head of the stud and prevents its withdrawal, whilst in the latter position the claws will move away from the head of the stud so as to allow the latter to be freely withdrawn similar to the manner described with reference to Figure 2 of the drawings. In order to normally maintain the sleeve in the position in which it grasps and retans the head of the stud, a volute spring 41 is provided which is located within the member 28, the spring engaging with the member 28 at its larger end and with the claw-like portions 32 of the sleeve member at its smaller end.

The cover member 33 is clamped in position within the member 28 by means of the prongs 43 provided on the member 28. Further, prongs 44 are provided on this member for the purpose of gripping the material to which the stud is to be applied; this material being indicated at 45 in Figure 4. A washer 46 is preferably disposed between the material and the prongs 44, this washer having recesses to receive the said prongs.

The action in this modified construction is exactly the same as in the preceding construction, means being provided for retracting the retaining means which are formed by the claws so as to allow the head of the stud to be freely inserted or withdrawn.

What I claim then is:—

1. A press stud comprising a stud; a socket for receiving the stud having a reduced neck portion tapering from an enlarged annular body portion; a sleeve having a series of claw-like members at one end, adapted to slide inside said annular body portion; a spring adapted to hold the said sleeve normally against the said reduced neck portion, and a stud member adapted to pass through an aperture in said reduced neck portion into the said sleeve so as to be surrounded by the said claws and to be gripped centripetally by said claws when they are drawn against the said reduced neck portion both by the action of the said spring and by the pulling of the said stud member.

2. A press stud comprising a stud; a socket for receiving the stud having a reduced neck portion tapering from an enlarged body portion; a claw-like retaining member extending through said enlarged body portion, the said claw-like member co-acting with the tapered portion of the said reduced neck portion to grip the stud; a spring within said annular body portion acting upon said claw-like member to hold it normally against the said tapered surface; and a head or knob on the exposed end of said claw-like member whereby the said member may be grasped and withdrawn from engagement with the tapered surface to permit the stud to be freely withdrawn.

3. A press stud comprising a stud; a socket for receiving the stud and having an annular body portion tapering down at one end to a reduced neck portion having a central aperture for the reception of the stud; a claw-like retaining member in said socket co-acting with the tapered surface to grip the stud; a volute spring arranged normally to hold the claws of the said retaining member against the said tapered surface so that the stud on entering the aperture in the said neck portion will push the said tapering surface against the said spring so as to release the claws of said retaining member and permit the stud to enter between said claws, the spring causing the said retaining member to be thrust back against the said tapering surface, thus closing the claws and centripetally gripping the stud.

4. A press stud comprising a stud; a socket member; a cover member for said socket member having an internally tapered surface and a central opening for the passage of the stud; a claw-like retaining member extending through said socket and co-acting with the tapered surface on the cover member to grip the stud; a volute spring within said socket, the smaller end thereof acting upon the claw end of the retaining member to normally hold it in engagement with the tapered surface; and a head on said retaining member whereby the latter may be grasped and withdrawn from engagement with the tapered surface to permit the stud to be freely inserted and withdrawn.

5. A press stud comprising a headed stud; a socket member having two cylindrical portions, one of which is of smaller diameter than the other; projecting lugs on the larger of said cylindrical portions; a cover member located in the larger of said cylindrical portions and fixed therein by some of said lugs, said cover member having an interior tapered surface with a central hole for the passage of the stud; a longitudinally split sleeve-like retaining member having claw-like ends which co-act with the tapered surface to grip the stud and having a projecting spigot at the opposite end; a volute spring, the larger end of which is retained between the socket member and the cover member and the smaller end of which fits around the retaining member and engages with the claws thereon to normally hold it in engagement with the tapered surface; and a cap secured on the projecting spigot of the retaining member and having flanges which fit around the small cylindrical portion of the socket whereby the retaining member can be withdrawn from engagement with the tapered surface to permit the stud to be freely inserted and withdrawn; this movement also serving to separate the stud from the socket.

In witness whereof I affix my signature.

CHARLES JOHN HOARE.